(12) United States Patent
Bro (10) Patent No.: US 9,180,601 B2
(45) Date of Patent: Nov. 10, 2015

(54) D-CUT SLICER

(75) Inventor: Thomas Bro, Storvorde (DK)

(73) Assignee: Marel Salmon A/S, Norresundby (DK)

( * ) Notice: Subject to any disclaimer, the term of this patent is extended or adjusted under 35 U.S.C. 154(b) by 1133 days.

(21) Appl. No.: 13/147,847

(22) PCT Filed: Feb. 3, 2010

(86) PCT No.: PCT/DK2010/050031
§ 371 (c)(1),
(2), (4) Date: Oct. 17, 2011

(87) PCT Pub. No.: WO2010/088913
PCT Pub. Date: Aug. 12, 2010

(65) Prior Publication Data
US 2012/0028557 A1 Feb. 2, 2012

(30) Foreign Application Priority Data

Feb. 4, 2009 (DK) .......................... PA 2009 00166

(51) Int. Cl.
| | |
|---|---|
| *A22C 25/00* | (2006.01) |
| *B26D 1/11* | (2006.01) |
| *A22C 17/00* | (2006.01) |
| *B26D 3/28* | (2006.01) |
| *B26D 5/00* | (2006.01) |
| *B26D 5/06* | (2006.01) |
| *B26D 7/06* | (2006.01) |
| *B26D 7/26* | (2006.01) |
| *B26D 5/32* | (2006.01) |

(52) U.S. Cl.
CPC .............. *B26D 1/11* (2013.01); *A22C 17/0033* (2013.01); *B26D 3/28* (2013.01); *B26D 5/007* (2013.01); *B26D 5/06* (2013.01); *B26D 5/32* (2013.01); *B26D 7/0625* (2013.01); *B26D 7/2614* (2013.01); *B26D 7/2628* (2013.01)

(58) Field of Classification Search
CPC ........ A22C 25/00; A22C 25/08; A22C 25/14; A22C 25/142; A22C 25/145; A22C 25/16; A22C 25/17; A22C 25/18
USPC .......... 452/125, 127, 156, 157, 160, 161, 165
See application file for complete search history.

(56) References Cited

U.S. PATENT DOCUMENTS

| | | | |
|---|---|---|---|
| 4,837,898 A * | 6/1989 | Hartmann et al. ............. | 452/119 |
| 7,081,048 B2 * | 7/2006 | Bech ............................. | 452/161 |

(Continued)

FOREIGN PATENT DOCUMENTS

| | | |
|---|---|---|
| DE | 4007503 | 9/1991 |
| DE | 4215951 | 11/1993 |

(Continued)

*Primary Examiner* — Richard Price, Jr.
(74) *Attorney, Agent, or Firm* — James Creighton Wray; Meera P. Narasimhan (57) ABSTRACT

Slicer apparatus of the type used for slicing in particular fish fillets, where the apparatus comprises a conveying path, and cutting means arranged in said conveying path, where the cutting means comprises a set of moveable reciprocating knives and a cutting land, where the cutting means further comprises means for moving the knives relative to the cutting land and the surface of the conveyor path, wherein the cutting means are arranged on a common member which member may be rotated through a predetermined arch about a horizontal axis, perpendicular to the conveyor path's transport direction.

14 Claims, 11 Drawing Sheets (56) References Cited

U.S. PATENT DOCUMENTS 7,559,830 B2 * 7/2009 Solberg et al. ............. 452/121
8,272,928 B2 * 9/2012 Finke et al. ............... 452/161
8,512,106 B2 * 8/2013 Ryan ......................... 452/121

FOREIGN PATENT DOCUMENTS

| DE | 10 2005 047 752 B3 | 10/2006 |
|----|---------------------|---------|
| JP | 06039784 | 2/1994 |
| WO | 00/05968 | 2/2000 |

* cited by examiner

D-CUT SLICER

This application claims the benefit of Danish Application No. PA 2009 00166 filed Feb. 4, 2009 and PCT/DK2010/050031 filed Feb. 3, 2010, which are hereby incorporated by reference in their entirety as if fully set forth herein.

FIELD OF THE INVENTION

The present invention relates to a slicer apparatus of the type used for slicing in particular fish fillets and a set of knives for use in such a slicer apparatus and furthermore to a method for slicing fish using both an apparatus and a set of knives according to the present invention.

BACKGROUND OF THE INVENTION

In the art a number of various slicing devices of the type mentioned above are well-known. Among the manufacturers of such slicing apparatuses are CP Food Machinery, GEBA Maschinentechnik and others. Common for all these prior art apparatuses is the fact that the fillet to be treated is placed on a conveyor which will transport the fish fillet past a cutting arrangement where the fish fillet is sliced according to pre-determined parameters. As the fillet passes the cutting arrangement, the slices will more or less be maintained in the shape of the original fish fillet and eventually be transferred to a board typically a piece of cardboard covered with a silver or gold look-alike finish. After this, the sliced fillet is vacuum-packed and sold for consumption.

Although a wide variety of meat products may be used with the slicing apparatus as described above they find widespread use when slicing fish fillets and in particular salmon and halibut fillets which may have been pre-treated before the slicing process.

A common problem with the prior art machines, is the fact that the working speed has been relatively low and that the cutting boom has been subject to deflection. When relatively wide fillets has been sliced, or in constructions where two conveyor systems are arranged in parallel two fillets have to be cut at the same time, the cutting boom was deflected whereby the cutting quality and variation in thickness of the slices occurred. This in turn resulted in a lowering of the quality of the finished product.

Furthermore, in order to be able to slice the fish products quickly enough, a set of reciprocating knives is used which reciprocating knives are forced through the meat of the fillet towards a cutting land. The cutting land is typically a plastic construction in which a groove is formed such that as the knife passes through the fish meat, it will be able to penetrate slightly into the cutting land due to the provision of a groove. When the angle between the knife's cutting plane and the land is initially adjusted a zero-point is created. This zero-point is the optimal position/angle of the knives relative to the cutting land where the knives of the cutter are at the closest with the cutting land such that a clear, clean and finished cut may be achieved during production. However, during the process of cutting fillets it is desirable to be able to change the cutting angle. As the cutting angle is changed, the relationship between the cutting land and the knives also changes whereby the zero-point is no longer achievable, whereby a lesser cutting result is achieved.

In order to optimize the output of the single fillet it is desirable to be able to change the cutting angle during cutting of each single fillet, and it has therefore been tradition to adjust the zero-point such that the major part of the slices, typically the slices in a middle region of the fish fillet, have optimum cutting conditions.

OBJECT OF THE INVENTION

It is therefore an object of the present invention to increase the cutting quality, improve the hygienic conditions around the machine and provide increased output without deteriorating the quality of the product.

DESCRIPTION OF THE INVENTION

This is achieved with a slicer apparatus of the type used for slicing in particular fish fillets, where the apparatus comprises a conveying path, and cutting means arranged in said conveying path, where the cutting means comprises a set of moveable reciprocating knives and a cutting land, where the cutting means further comprises means for moving the knives relative to the cutting land and the surface of the conveyor path, wherein the cutting means are arranged on a common member which member may be rotated through a predetermined arch about a horizontal axis, perpendicular to the conveyor path's transport direction.

With this inventive construction both the knives and the cutting land are arranged on a common member which will typically be in the shape of a relatively large disc such that as the angle of the knives changes, by rotating the disc the cutting land will be rotated in exactly the same manner. In this fashion the zero-point, i.e. the optimal cutting point between the knives and the cutting land, is maintained regardless of the cutting angle between the knives and the fish fillet placed on the conveyor part. The pre-determined arch will be discussed further below, but typically the rotation of the common member shall be allowed to be such that any desired cutting angle, i.e. the angle between the plane of the knives and the conveyor part's surface may be achieved.

In a further advantageous embodiment the conveyor part is substantially linear and the path comprises first, second and third separate conveyors arranged end to end, and the cutting means are arranged between the second and third conveyor seen in the conveyor path's travelling direction.

The reason for providing first, second and third separate conveyors is that different conditions are present along the conveyor path. On the first conveyor the surface of the conveyor shall be such that it is suitable to receive the fish fillets as these are transferred either manually or automatically onto the slicer apparatus.

The second separate conveyor usually comprises means for increasing the friction between the fish fillet and the conveyor in that the second conveyor will push the fish fillet through the cutting means and as such must be able to have a firm interaction with substantially the entire surface of the fish fillet in contact with the conveyor, and be able to progress the fish fillet through the cutting means such that the desired slicing operation may be carried out. Typically the conveyor belt's surface will be provided with small spikes which will insert themselves into the fish meat as the fish fillet is transferred from the first conveyor to the second conveyor. By having a substantial amount of spikes distributed in the surface of the second conveyor a relatively firm connection is created between the fish fillet and the conveyor whereby any distortion which could arise due to the engagement of the cutting means with a fish fillet is minimised.

The third conveyor is suitable to receive the sliced fish fillet and transfer the fish fillet for further handling, for example onto a cardboard member which will thereafter be packaged for transport etc.

In a still further advantageous embodiment of the invention means for detecting the thickness perpendicular to the conveyor's surface of a fish fillet transported on the first conveyor is provided, and where said means provides input to the cutting means.

By detecting the thickness of the fish fillet it is possible, by angling the cutting means as described above to achieve that the finished fish slices may have a desired size. For example by tilting the cutting means such that the cutting angle relative to the conveyor path's surface is relatively shallow relative large slices may be obtained.

In the art the type of slicer apparatuses to which the present invention is directed are also known as D-cut slicers in that the side of the fish fillet facing the conveyor belt will typically be relatively linear whereas the upwards facing surface of the fish fillet will be slightly rounded as the round part of the D. By cutting the fish fillet into slices as described above a single slice will therefore have a D-shape.

The thickness of the fish fillet determines the optimum distribution with respect to area, cutting angle and slice thickness and is therefore an important parameter in deciding how to cut the fish fillets. When treating for example salmon fish fillets they will typically have a more or less standardized size due to most salmon being bred under farm-like conditions such that the length, width etc. will be more or less constant. By furthermore determining the thickness of the fish fillet it is possible very accurately to cut slices which will have a pre-determined weight or a pre-determined size.

In a still further advantageous embodiment the means for moving the knives relative to the cutting land comprise active moveable guide means arranged in both ends of the knives, where the active guide means are coupled to one common actuator.

With the prior art apparatuses one of the problems when slicing thick, very dense or slightly frozen fish fillets was the fact that the boom on which the knives were arranged would be deflected as the knives would engage the fish fillet. The resulting slicing of the fish fillet would therefore not be very accurate and the overall quality would leave something to be desired. In order to avoid the deflection of the knives the present invention has provided active movable guide means in both ends of the knives such that the risk of having the knives deflected is much less. The fact that the guide means are active which in this connection shall be understood as being able to transfer forces to the knives as such provides the facility of transferring forces to the knives in both ends of the knives such that a substantially larger amount of force may be introduced to the knives without deflection.

Furthermore, by connecting the active movable guide means in both ends of the knives to one common actuator a completely homogenous movement of the knives relative to the cutting land is achieved. In this manner a completely straight and uniform cut will be achieved by the knives along the entire cutting edge, as the guide means in either end of the knives will perform exactly the same relative movement. Below in the description relating to a specific embodiment this movement will be further elaborated.

In a still further advantageous embodiment one, two or more conveyor paths are arranged in parallel and the cutting means extends across all conveyor paths.

As most of the fish fillets will, as described above have more or less a uniform size it is possible to arrange more parallel conveyor paths next to each other such that the apparatus in one movement will cut two, three or more slices depending on the number of conveyor paths arranged in parallel. Especially in the embodiment where active movable guide means are arranged in both ends of the knives as already described above, the forces arising having relative long knives spanning two or three conveyor paths is substantially reduced due to the active guide means in either end of the knives. It is therefore possible to maintain a high production rate with a high quality even when more conveyor paths are arranged in parallel.

In a still further advantageous embodiment of the invention a computer-based system is pre-programmed with information concerning theoretical data relating to fish fillets, where input means are provided such that an operator may select a first, second and/or third fixed parameters after which the computer in response to the input received from the means for detecting the thickness controls, the cutting means such that the desired slicing of the fish fillet occurs.

As already briefly mentioned above fish fillets may have a substantially uniform size at least for batch-wise processing such that by storing information relating to the typical weight, length and width it is possible with very little input to programme the machine to achieve the optimum slicing process.

As an example the length of the fillet may be split into for example three distinct sections, a tail section, a middle section and a front section, where the cutting parameters may be different. For example it may be desirable to cut thinner slices in the tail and front section and relatively thicker slices in the middle section, and in order to achieve substantially large size slices in all sections, the cutting angle may be different from the tail section to the middle section in that the tail section is usually relatively thinner, i.e. the height between the conveyor belt's surface and the top of the fillet is less in the tail section than it is in the middle section. Any of these values may be input or only very few of them, for example the desired slice thickness. If the input is the desired slice thickness, the computer will use this input in connection with already stored input relating to the type of fish, the size of fish fillets etc. and in this manner generate the other necessary parameters in order to achieve a slicing as desired.

In a still further advantageous embodiment a vision system is arranged either in place of the thickness detection means or in addition to the thickness detection means, and upstream from the cutting means, where the vision system detects any of the following characteristics of the fish fillet: size, circumference, thickness, colour, fat, irregularities, and where said characteristics optionally in combination are input for the computer-based system generating the control of the cutting means.

The vision system is typically coupled to the computer such that from detecting characteristics of a fish fillet passing the vision system an appropriate set of pre-programmed data relating to the input from the vision system may be selected such that individual cutting parameters for exactly that particular fish fillet which is passing the vision system may be communicated to the cutting means. In this manner it becomes possible to randomly cut fish fillets of different sizes and even of different species. It is well-known in the art that the fish meat and thereby the species may be determined from the colour and the density of the fish meat so that by programming the vision system accordingly, also these types of characteristics may be determined. Furthermore, the vision system is connected to a control system such that any irregularities, excessive fat contents or variations in colour is detected at this stage and the fish fillet containing such trigger items may be sorted and conveyed to a different place. The vision system may naturally be programmed simply to detect the thickness and/or colour of the fish fillet passing under the vision system in order to control the cutting means in order to optimize the slicing process.

In more advanced systems and also in systems where the fish fillet has a larger variety of species, size, weight etc. the vision system is programmed in a more advanced manner.

In a further advantageous embodiment the set of reciprocating knives comprises two mirror image knives, where each knife has a first end and a second end, and a cutting edge along an edge on a major part of the distance between the first and second end, where means for releasably attaching the knives to a reciprocating holder is provided, where the means in said first end comprises a stud arranged adjacent the end and perpendicular to the plane of the knife, where said stud extends between 5 mm and 30 mm, preferably between 10 mm and 15 mm from the blade of the knife, and where the means in the second end comprises a flat section where the edges are blunt.

It is known in the art to use reciprocating knives for slicing apparatuses of this type. One known problem here, however, is the fact that as production increases, they wear out rather quickly. Especially when used to cut hard items or semi-hard items such as for example partly frozen or entirely frozen fillets the tear and wear on the knives is relatively high.

Furthermore, the knives need to be in a condition where they are very sharp, especially when cutting the tail sections of for example salmon or the skin in cases where the fish skin is left on the fillets very sharp knives are required. This is due to the fact that the tail section of a fish fillet usually comprises tendons and nerves which makes it relatively more difficult to cut these sections than for example the middle section where most of the tendons and nerves has been removed during the de-boning and filleting process. Also for hygienic reasons it is very important to be able to remove the knives very quickly such that a thorough cleaning of the apparatus may be achieved.

With the inventive method of mounting the knives in the reciprocating holder by means of inserting a stud into a pre-shaped hole and loosely holding the opposite end of the knife, but guiding this end very accurately, it is possible to replace the knives very quickly such that production stops can be kept at a minimum.

In a further advantageous embodiment of the invention the common member in which the cutting means are arranged rotates through a predetermined arch about a horizontal axis, perpendicular to the conveyor paths transport direction, where said arch changes the angle of cutting from 5° to 90° more preferred from 7° to 75° and most preferred from 10° to 35° relative to the plane of the conveyor path's transport surface.

As the rotation of the common member determines the cutting angle, it is important that the arch through which the common member is allowed to rotate addresses all desirable cutting angles.

The invention is also directed at a set of knives for use in a slicer apparatus as described above where the advantages of the set of knives shall particularly be found in the fact that each knife has a first end and a second end and a cutting edge along an edge on a major part of the distance between the first and second end, where means for releasably attaching the knives to a reciprocating holder is provided, where the means in said first end comprises a stud arranged adjacent said first end and perpendicular to the plane of the knife, where said stud extends between 5 mm and 30 mm, preferably between 10 mm and 15 mm from the blade of the knife, and where the means in the second end comprises a flat section where the edges on said flat section are blunt.

The inventive apparatus as well as the set of knives are particularly useful in a method for slicing fish fillets in a slicer apparatus as described above where said apparatus comprises a conveying path and cutting means arranged in said conveying path, where the cutting means comprises a set of moveable reciprocating knives and a cutting land, where the cutting means further comprises means for moving the knives relative to the cutting land and the surface of the conveyor path and where the cutting means are arranged on a common member which member may be rotated through a predetermined arch about a horizontal axis, perpendicular to the conveyor path's transport direction where the fillet to be sliced is placed on said first conveyor and where the conveyor path is substantially linear and that the path comprises first, second and third separate conveyors arranged end to end for transporting the fillet through the apparatus, and where the cutting means are arranged between the second and third conveyor seen in the conveyor path's travelling direction, and where the means for detecting the thickness perpendicular to the conveyor's surface of a fish fillet transported on the first conveyor, provides input to the cutting means, where the input is relayed to a pre-programmed computer, where information relating to fillet size, fillet weight, slice thickness, fillet meat condition and conveyor speed is used by the computer to provide the cutting means with optimum parameters, according to the desired output, where the output relating to each fillet may be defined as a number of slices, area of each slice, weight of each slice and the like, and where the input is further used to control the travel of the knives relative to the cutting land such that the distance is kept as short as possible.

The method steps describes the utilization of the different features of the apparatus as already discussed above and it is clear that the utilization of an inventive and advantageous apparatus as described above also provides for a production method with all the advantages already listed above.

DESCRIPTION OF THE DRAWING

The invention will now be described with reference to the accompanying drawing wherein

FIGS. 7a and 7b illustrates a knife being held by the knife holder,

Figure 1A:
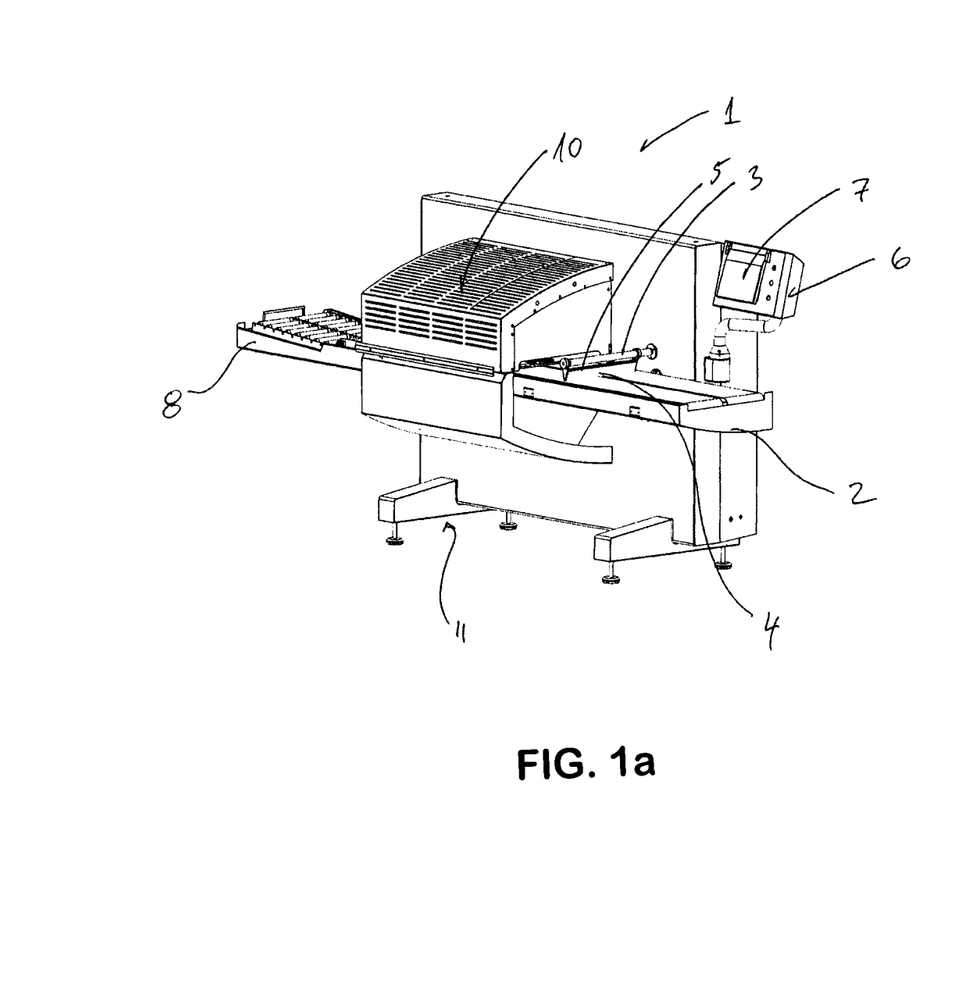
FIGS. 1a and 1b illustrates an embodiment of the invention in a production ready mode.
Figure 1B:
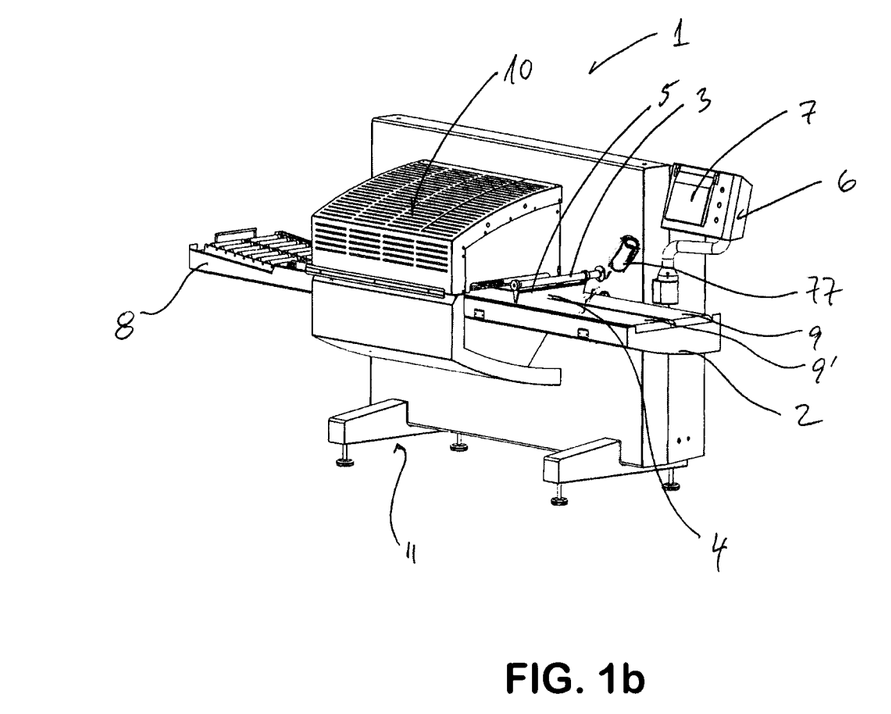

In FIG. 1 is illustrated an embodiment of the invention. The illustrated apparatus 1 is in a production ready mode in that the moving parts except for the conveyor belts are enclosed in protective covers 10, 11. The conveying path 2 is here illustrated as it apparently appears to be continuous but is in fact, as will be described below, constituted by three separate conveyor belts. A mechanism 3 for detecting the thickness of the fish fillets arranged on the conveyor path 2 is arranged upstream from the cutting mechanisms hidden by the covers 10, 11. The height measuring mechanism 3 in this embodiment operates such that as a fish fillet is put on the conveyor path 2 it will engage the flap 4 which will make the axle 5 rotate which rotation is detected and converted to a height measurement.

The apparatus 1 is furthermore equipped with a control station 6 which in this embodiment comprises a touch screen 7. Below various functionalities of the touch screen 7 will be discussed.

As shown in FIG. 1b, slicer apparatus 1 further comprises a vision system 77 arranged either in place of the thickness detection means or in addition to the thickness detection means 3, and upstream from the cutting means under covers 10, 11. The vision system 77 detects any of the following characteristics of the fish fillet: size, circumference, thickness, color, fat, irregularities, and these characteristics optionally in combination are input for the computer-based system generating the control of the cutting means.

After fillets are placed on the conveyor path 2 and have passed the height measuring device 3 and the cutting means hidden by the covers 10, 11 the sliced fillet will eventually be transferred to a packaging conveyor 8 arranged at the very downstream end of the conveying path 2.

Figure 2:
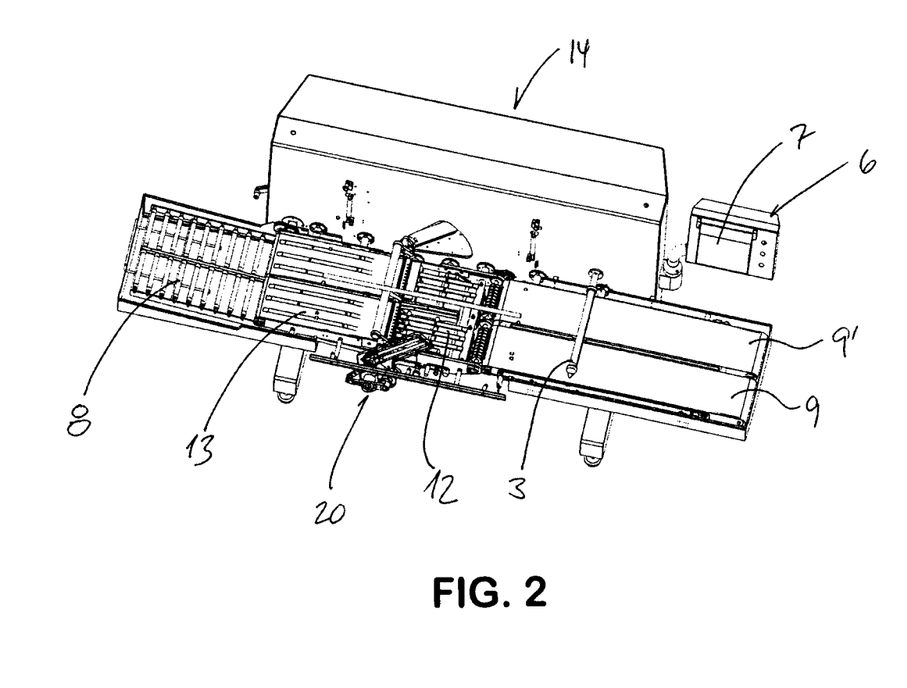
FIG. 2 illustrates the invention from an angle seen slightly from above and with the covers 10, 11 removed.

In FIG. 2 the apparatus 1 is illustrated from an angle seen slightly from above and with the covers 10, 11 removed. In this manner it is possible to detect the three conveyors where a first conveyor 9 arranged upstream from the cutting mechanism transport the fish fillets towards the thickness measuring device 3 and eventually the cutting means. The second conveyor 12 is in this embodiment illustrated without a conveyor belt, but will bridge the gap between the first and the third conveyor 13. The second conveyor 12 is special in that it comprises means, for example in the shape of spikes protruding from the surface of the conveyor belt which spikes will insert themselves into the fish meat such that a very firm and stable connection is established between the conveyor belt and the fish fillet. This is necessary in that the cutting means 20 will impact some force to the fish fillet whereby it is necessary to ensure a fixed hold on the fish fillet in order to produce the required quality. The mechanism for powering and operating the cutting means 20 is partly visible, but will be explained in detail below, and the part not visible is enclosed in the housing 14.

In this particular embodiment parallel sets of conveyors 9, 9' are arranged such that two fish fillets at one time may be sliced by the cutting means 20. The packaging station 8 comprises means underneath the third conveyor 13 for placing, for example a piece of cardboard in the transport direction of the third conveyor 13 such that the sliced fish fillet transported on the conveyor 13 will be delivered onto the cardboard 13 for further processing, for example vacuum packaging etc.

Figure 3:
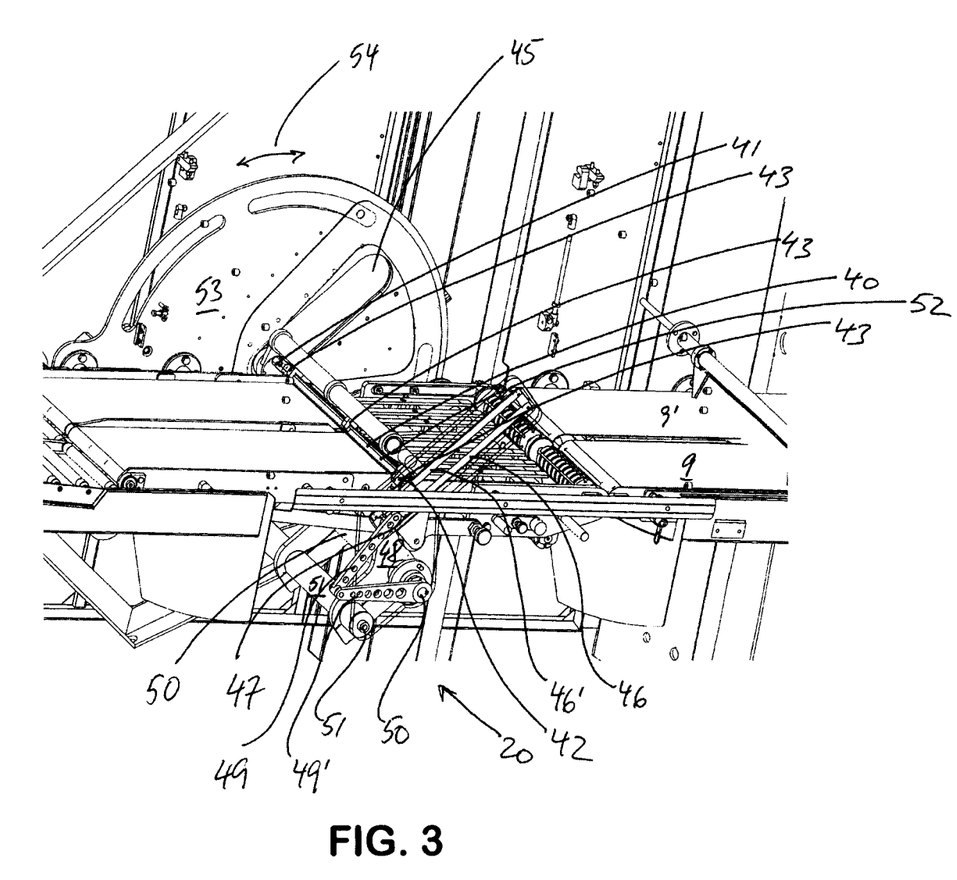
FIG. 3 illustrates a close-up of the cutting means.

In FIG. 3 a close-up of the cutting means is illustrated where certain elements have been hidden.

The cutting means 20 comprises a set of knives 40 which are releasably held in knife holders 41, 42 arranged in either end of the knives. In this example where two conveyor belts 9, 9' are arranged in parallel, the knives 40 therefore have relatively long cutting edges, a support structure 43 is provided in order to minimize deflection, bending etc. of the knives 40 during operation. As the impact (load) from engagement with the fish along the cutting edge may be estimated as evenly distributed the fact that the knives are fastened and driven in both ends of the knives, reduces the load significantly. The load depends on the length squared, so by reducing the free length the load is reduced by the square root. The knife holders 41 are arranged in guiding means 44, 45 arranged in either end of the knives 40. The guiding means 44 in this embodiment comprises two axles 46, 46' as well as a sliding element 47 arranged such that it may slide up and down along the axle 46, 46'. A base plate 48 is arranged such that it may rotate about the axle 50. The rotation occurs when the axle 51 is moved in an arch as will be explained below. As the axle 51 is moved along an arch the axle 46, 46' will change their angle relative to the surface of the conveyors 9, 9'.

The sliding element 47 is coupled by means of the arms 49, 49' to the axle 50. As the axle 50 is brought to turn back and forth as will be explained below, the arms 49, 49' will cause the sliding member to move up and down along the guiding axles 46, 46' and in turn move the knives 40 to and from the cutting land 52.

In the opposite end of the knives the housing cover has been removed in order to illustrate the mechanism. The guiding means 45 are provided in a substantially circular plate member 53 which may be rotated back and forth as indicated by the arrow 54. The axles 50, 51 are fastened to this circular plate 53 such that as the circular plate member 53 is rotated as indicated by the arrow 54, the base plate 48 will also be rotated whereby the angle between the knives relative to the conveyor belt's surfaces will be altered.

Figure 4:
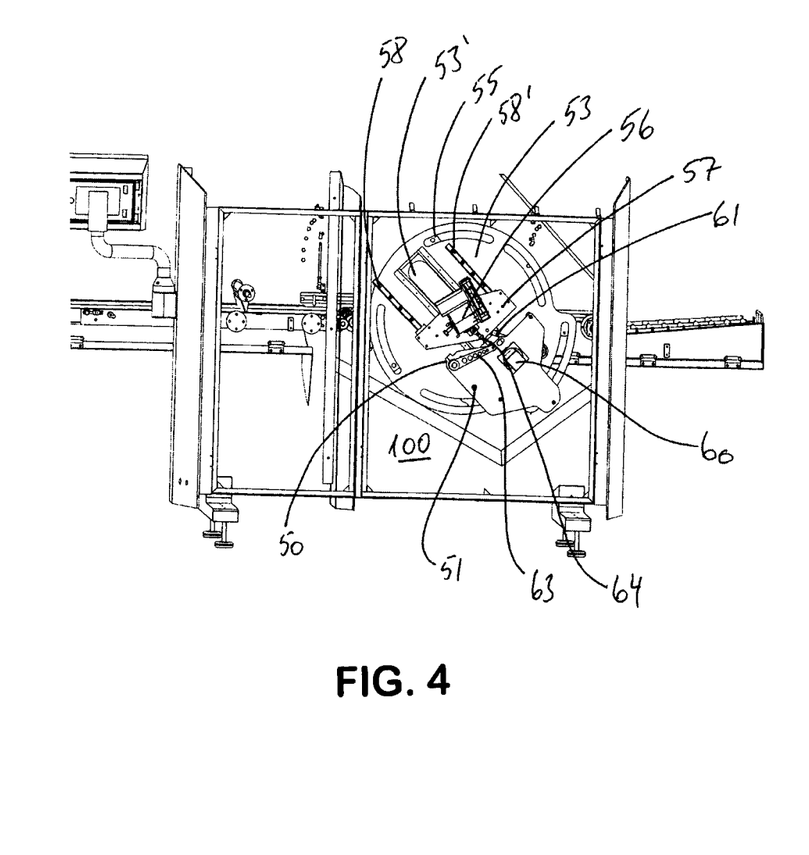
FIG. 4 illustrates a view from behind the apparatus inside the housing.

Turning to FIG. 4 for a view from behind the apparatus the movement of the circular plate member 53 is limited by the stop blocks 55. In practice the movement 54 of the member 53 back and forth is effected by an electrical step motor arranged on the back plate 100 with a pinion and rack engagement with the plate 53.

Figure 5:
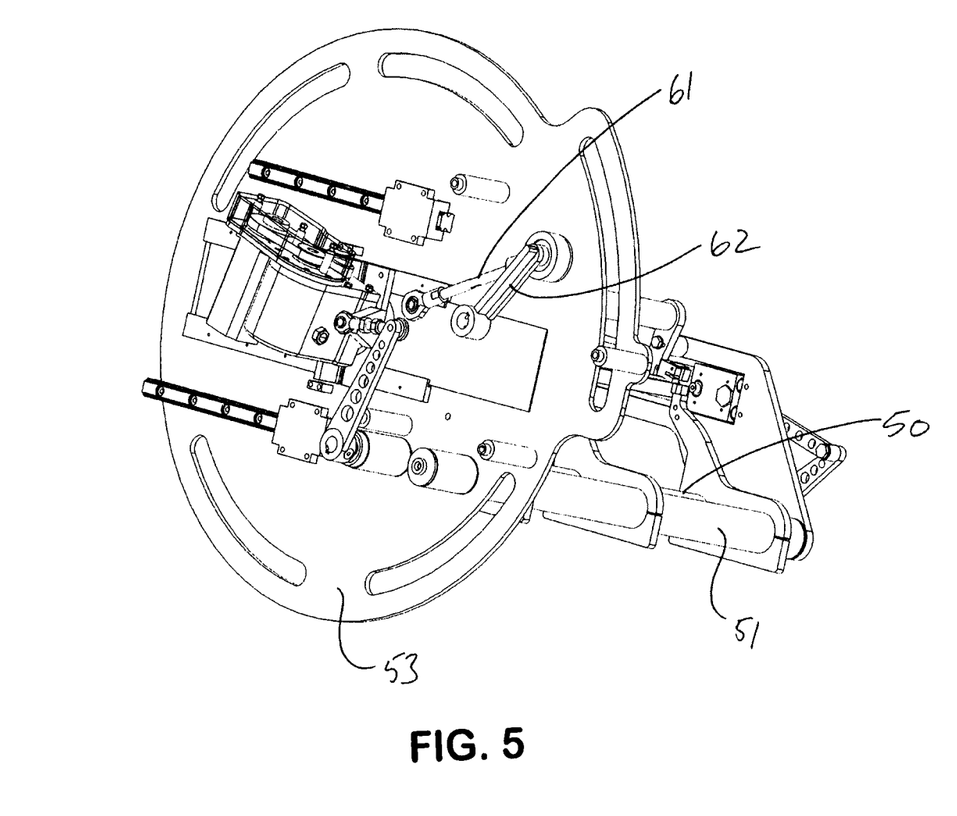
FIG. 5 illustrates the cutting means arrangement and the mechanism for adjusting the cutting angle.

Motor means 56 are provided for reciprocating the knives 40. The motor means 56 are mounted on a plate member 57 which plate member in turn is slidably movable along the rails 58, 58'. The rails 58, 58' are parallel to the guiding axles 46, 46' and the guiding means 45 (see FIG. 3) provide access for the motor means 56 to the knives 40 on the other side of the cover plate 45' arranged in the guiding means 45 and the plate member 53. In order to move the plate member 57 back and forth along the rails 58, 58' and thereby create the movement of the knives relative to the surface of the conveyor belts the motor 60 is provided, which motor by means of articulated arms 61 is coupled to the plate 57. The plate member 57 is connected to a motor 60 by means of two arms 61, 62 (62 visible in FIG. 5). As the motor rotates the arms will make the plate member 57 move back and forth and thereby move the motor means up and down along the rails 58, 58' and likewise the opposite end of the knife/cutting means along the guiding axle 46, 46' such that the knives 40 will cut into for example a fish fillet transported by the conveyors into the cutting means 20 as described above.

The arms 63, 64 will transfer the movement of the plate member 57 to the axle 50 which will manipulate the arms 49, 49' such that the sliding member 47 will slide along the guide axle 46, 46' at exactly the same velocity as the plate member 57. In this manner it is established that the knives 40 will be actively moved in both ends of the knives by relative rigid sliding and guiding means such that a uniform and very stable construction achieves a very precise cutting action with increased quality.

Figure 6:
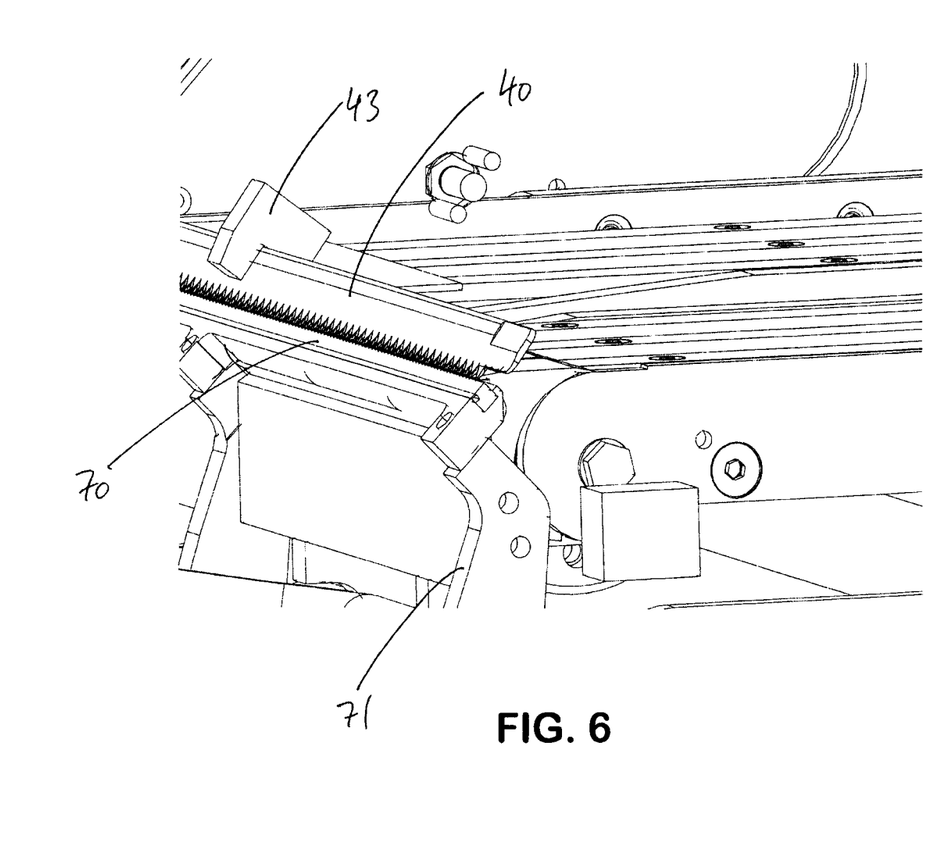
FIG. 6 illustrates details with the knives and the cutting land.

As already discussed earlier it is very important in order to achieve a perfect cut that the knives 40 engage the cutting land 70 (see FIG. 6). As the cutting land 70 by means of the arm 71 is fixedly mounted to the base plate 48, see FIG. 3, the knives 40 will always have the same angle relative to the cutting land 70 such that the zero-point, i.e. the point where the optimum cutting is achieved, is always maintained at the optimum angle.

Figure 7A:
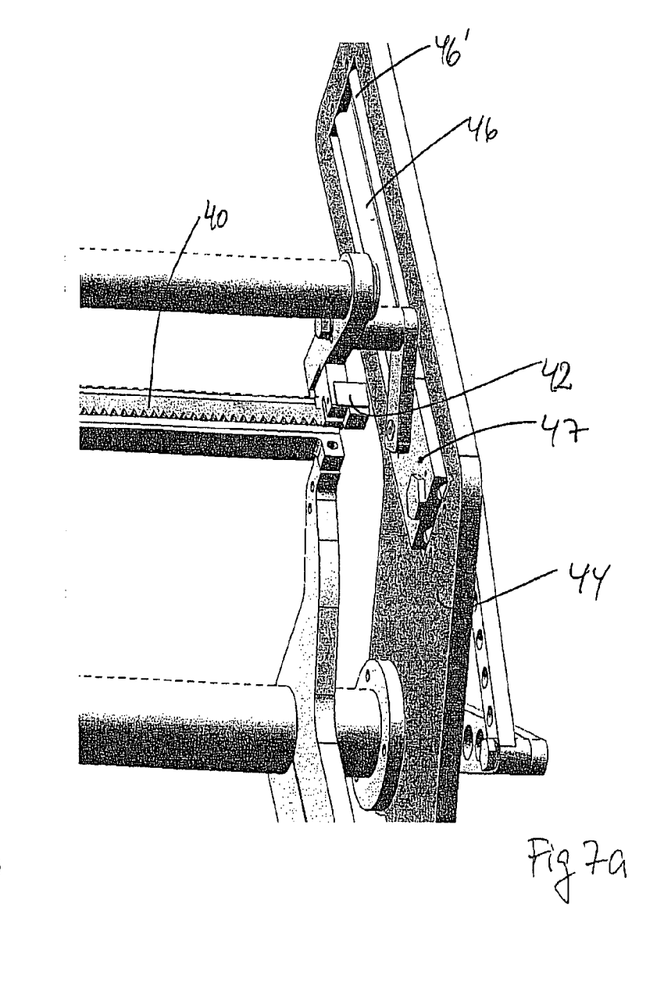

With reference to FIGS. 7a, 7b, 8a and 8b the inventive principles relating to how the knives are fastened in the apparatus and the knives themselves will be discussed. In FIG. 7a is illustrated a knife being held by the knife holder 42. Also seen are the guiding axles 46, 46' and the base plate 44.

The knife holder 42 comprises a first member 81 which is more or less identical to the guiding members 43 as already mentioned above. The member 81 is fastened to the arm 90 which in turn is in rigid connection with the sliding member 47. The end 110 of the knives 40 are provided with blunt edges such that they do not wear on the member 81. The member 82 will after the end 110 is positioned in the slit in the member 81 be superposed such that the member 82 will maintain the end 110 in the slit provided in the member 81. By furthermore placing the screw 80 into superposed apertures in the members 82 and 81 and fixing it for example by an internal thread provided in the member 81 or by a nut, it is impossible for the knife end 100 to become free of the knife holder 42.

Still, the arrangement allows the two knives 40 to reciprocate in the direction indicated by the arrow 91.

Figure 8A:
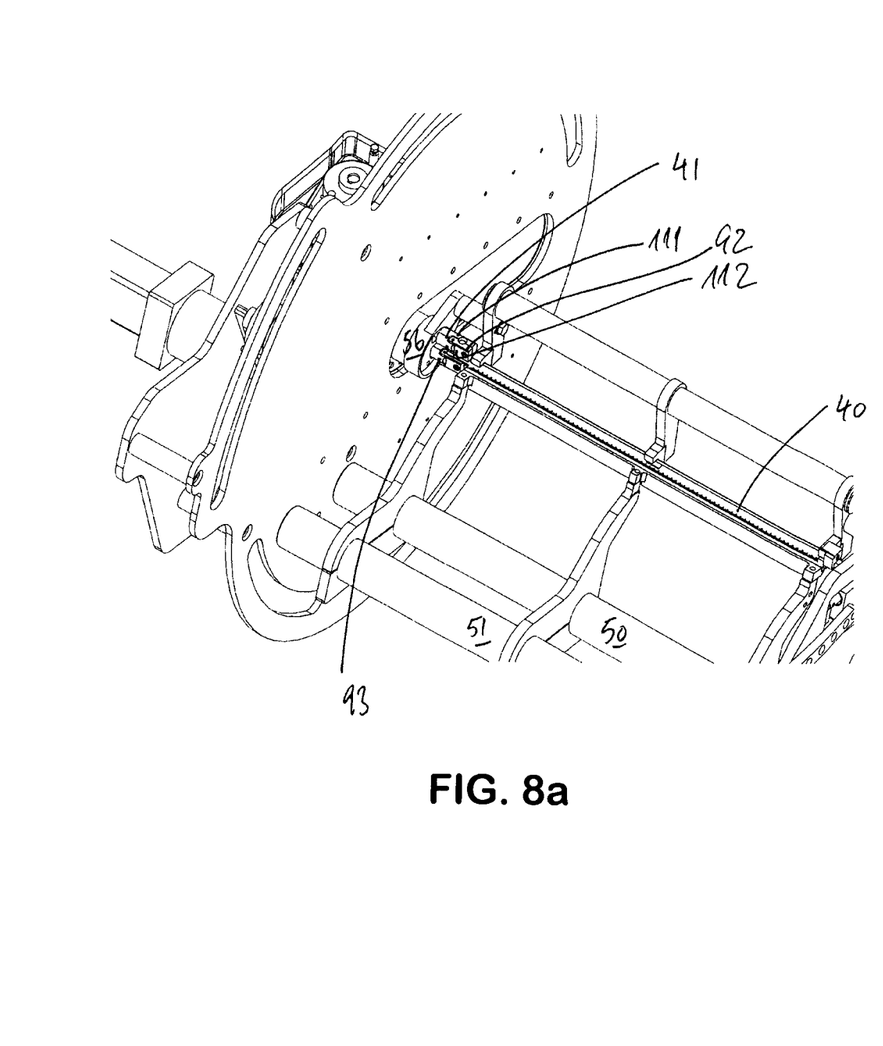
FIGS. 8a and 8b illustrates the fastening of the knives in the opposite end.
Figure 8B:
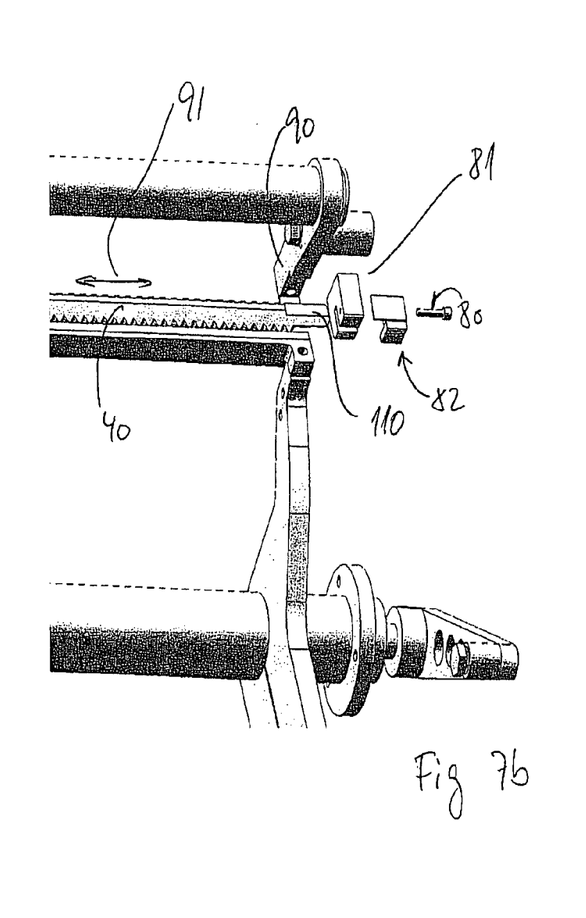

The fastening 41 of the knives 40 in the opposite end will be described with reference to FIGS. 8a and 8b.

As there are two knives 40 reciprocating back and forth they need two knife holders 92, 93 in order for the two knives to be independently fastened to the reciprocating means 56. The knife holders 92, 93 comprise a main body 111 as well as a closure member 112 for holding the knife. In FIG. 8b the closing member 112 has been removed, and as is evident from the "exploded view" the closing member may be pivotly mounted on the main body 111, and when closing a screw may be inserted such that an openable holder is provided as illustrated with reference to FIGS. 8a and 8b. Adjacent the end of the knife 40 a protrusion 115 in the shape of a short cylinder, for example made from the same material as the knives, is welded on such that it protrudes at a 90° angle with respect to the plane of the knife's blade 40.

The holder 92, 93 will be provided for loose engagement with the protrusion 115 such that the double holders 92, 93 will maintain the knives in the holder due to the relatively short distance between the two holders 92, 93. At the same time the knives will be firmly held for reciprocating movement back and forth. When having to replace the knives the opening member 112 is removed, and as the knives as explained with reference to FIGS. 7a and 7b are only loosely held in the opposite end, it is very easy to remove the knives, insert a new set of knives and simply by placing the screws in the opening member 112 closing and thereby fixing the knives in the holder 92, 93, and the machine is ready for operation again.

As the holders 92, 93 is furthermore arranged in a position where they are accessible without having to remove the conveyor belts, it is fairly easy to replace the knives, whereby only short down times may be expected should a knife fail or need to be replaced due to wear and tear.

Figure 9:
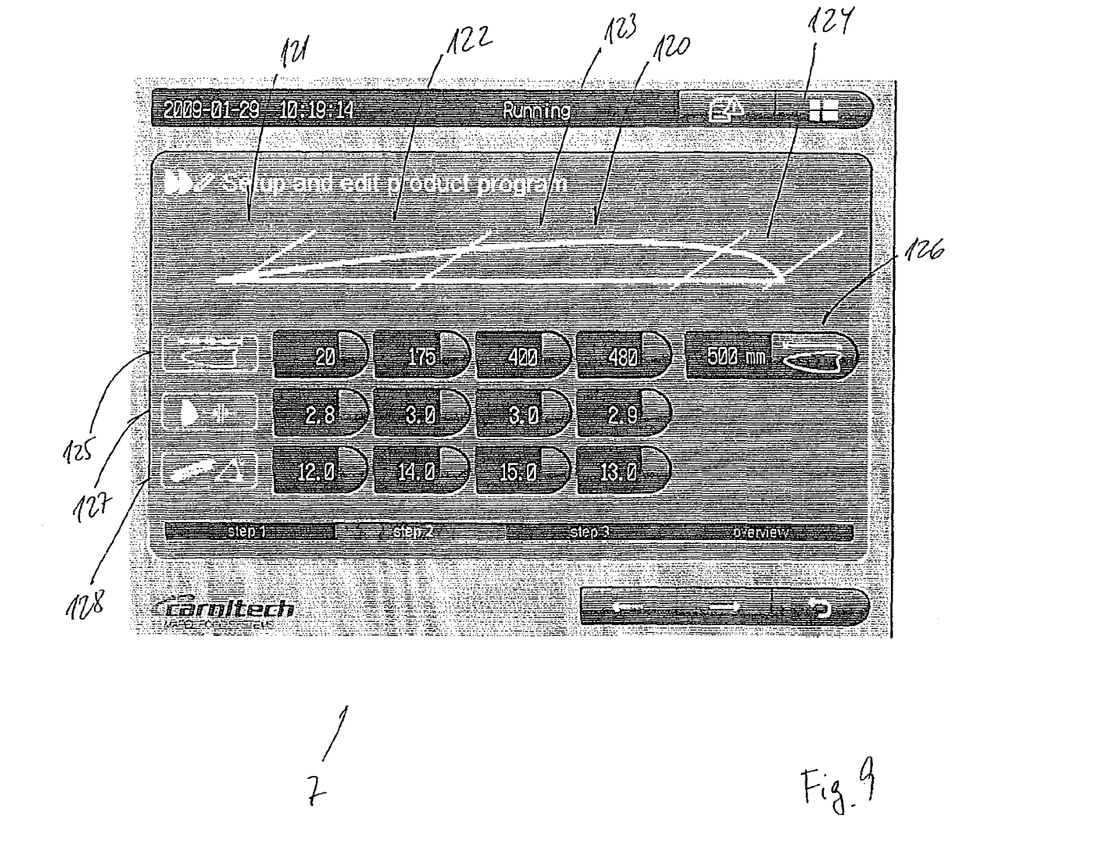
FIG. 9 illustrated what the touch screen lay-out 7 may look like for the operator.

In FIG. 9 is illustrated what the touch screen lay-out 7 may look like for the operator. Schematically, a longitudinal cross section of a fish fillet 120 is illustrated. The cross-section is subdivided into four sections 121-124. For each section it is possible to adjust the length by selecting the values in the first row 125 such that for example the section 121 is in this example illustrated as being from 0 to 20 millimeters, the second section 122 from 20 to 175 millimeter and so forth.

Initially, the average size of the fish fillets has been selected in this instance to approximately 500 millimeters as indicated in the window 126. The thickness of the slices in each section may be selected in the row 127. In this example the first section 121 will have a slice thickness of 2.8 millimeters, and the third section will for example have a slice thickness of 3 millimeters.

In the third row 128 the angle of the knives relative to the conveyor's surface may be selected. In this example the angles in the different sections vary between 12 and 15°. Each of these parameters may be put in manually, or a pre-programmed set of data may be selected, for example the value in 126 could be selected, i.e. a fillet having a length of 500 millimeters and the desired slice thickness in row 127. Based on this the computer will with reference to the stored date and the pre-programmed data select the appropriate length of the sections 121-124, and the appropriate cutting angles in row 128.

The system can also be programmed such that a desired weight of each slice optionally in each section is entered, after which the software determines the cutting parameters. Basically any input may be used in order for the software to carry out the desired cutting process.

The invention claimed is:

1. Slicer apparatus of the type used for slicing fish fillets, where the apparatus comprises a conveying path having at least one conveyor and cutting means arranged in said conveying path, where the cutting means comprises a set of moveable reciprocating knives and a cutting land, where the cutting means further comprises means for moving the knives relative to the cutting land and a surface of the at least one conveyor, wherein the cutting means are arranged on a common member which member may be rotated through a pre-determined arc about a horizontal axis, perpendicular to the conveyor path's transport direction.

2. Slicer apparatus according to claim 1, wherein the conveying path is substantially linear and that the path comprises first, second and third separate conveyors arranged end to end, and that the cutting means are arranged between the second and third conveyor in a travelling direction of the conveying path.

3. Slicer apparatus according to claim 2 further comprising means for detecting the thickness perpendicular to the first conveyor's surface of a fish fillet transported on the first conveyor, and where said means for detecting provides input to the cutting means.

4. Slicer apparatus according to claim 1 wherein the means for moving the knives relative to the cutting land comprises active moveable guide means arranged in both ends of the knives, where the active guide means are coupled to one common actuator.

5. Slicer apparatus according to claim 1, wherein one, two or more conveying paths are arranged in parallel and where the cutting means extends across all conveyor paths.

6. Slicer apparatus according to claim 3 further comprising a computer-based system is pre-programmed with information concerning theoretical data relating to fish fillets, where input means are provided such that an operator may select a first, second and/or third fixed parameters after which the computer in response to the input received from the means for detecting the thickness controls the cutting means such that the desired slicing of the fish fillet occurs.

7. Slicer apparatus according to claim 6 further comprising a vision system arranged either in place of the thickness detection means or in addition to the thickness detection means, and upstream from the cutting means, where the vision system detects any of the following characteristics of the fish fillet: size, circumference, thickness, colour, fat, irregularities, and where said characteristics optionally in combination are input for the computer-based system generating the control of the cutting means.

8. Slicer apparatus according to claim 1, wherein the set of reciprocating knives comprises two mirror image knives, where each knife has a first end and a second end, and a cutting edge along an edge on a major part of the distance between the first and second end, where attaching means for releasably attaching the knives to a reciprocating holder is provided, where the attaching means in said first end comprises a stud arranged adjacent the end and perpendicular to the plane of the knife, where said stud extends between 5 mm and 30 mm, and where the means in the second end comprises a flat section where the edges are blunt.

9. Slicer apparatus according to claim 1, wherein the common member on which the cutting means are arranged rotates through a predetermined arc about a horizontal axis, perpendicular to the conveyor paths transport direction, where said arc changes the angle of cutting from 5° to 90° relative to the plane of the conveyor path's transport surface.

10. Method for slicing fish fillets in a slicer apparatus according to claim 1, where said apparatus comprises a conveying path and cutting means arranged in said conveying path, where the cutting means comprises a set of moveable reciprocating knives and a cutting land, where the cutting means further comprises means for moving the knives relative to the cutting land and a surface of the conveying path and where the cutting means are arranged on a common member which member may be rotated through a predetermined arc about a horizontal axis perpendicular to the conveying path's transport direction and where the conveying path is substantially linear and the conveying path comprises first, second and third separate conveyors arranged end to end for transporting the fillet through the apparatus, where the fillet to be sliced is placed on said first conveyor and where the cutting means are arranged between the second and third conveyor in a travelling direction of the conveying path, and where the means for detecting the thickness perpendicular to the first conveyor's surface of a fish fillet transported on the first conveyor provides input to the cutting means, where the input is relayed to a pre-programmed computer as information relating to fillet size, fillet weight, slice thickness, fillet meat condition and conveyor speed is used by the computer to provide the cutting means with optimum parameters, according to a desired output relating to each fillet may be defined as a number of slices, area of each slice, weight of each slice, and where the input is further used to control travel of the knives relative to the cutting land such that a distance between the knives and the cutting land is kept as short as possible.

11. Slicer apparatus according to claim 1, wherein the set of reciprocating knives comprises two mirror image knives, where each knife has a first end and a second end, and a cutting edge along an edge on a major part of the distance between the first and second end, where attaching means for releasably attaching the knives to a reciprocating holder is provided, where the attaching means in said first end comprises a stud arranged adjacent the end and perpendicular to the plane of the knife, where said stud extends between 10 mm and 15 mm from the blade of the knife, and where the attaching means in the second end comprises a flat section with blunt edges.

12. Slicer apparatus according to claim 1, wherein the common member on which the cutting means are arranged rotates through a predetermined arch about a horizontal axis, perpendicular to the conveyor paths transport direction, where said arch changes the angle of cutting from 7° to 75° relative to the plane of the conveyor path's transport surface.

13. Slicer apparatus according to claim 1, wherein the common member on which the cutting means are arranged rotates through a predetermined arch about a horizontal axis perpendicular to the conveyor paths transport direction, where said arch changes the angle of cutting from 10° to 35° relative to the plane of the conveyor path's transport surface.

14. Slicer apparatus according to claim 8, wherein said stud extends between 10 mm and 15 mm from the blade of the knife.

* * * * *